United States Patent [19]

Naoi et al.

[11] Patent Number: 5,783,330
[45] Date of Patent: Jul. 21, 1998

[54] ELECTRODE MATERIAL AND SECONDARY BATTERY

[75] Inventors: Katsuhiko Naoi, Tokyo; Hiroshi Iizuka, Shizuoka; Yasuhiro Suzuki, Shizuoka; Akihiko Torikoshi, Shizuoka, all of Japan

[73] Assignee: Yazaki Corporation, Tokyo, Japan

[21] Appl. No.: 715,840

[22] Filed: Sep. 26, 1996

[30] Foreign Application Priority Data

Sep. 28, 1995 [JP] Japan ............ 7-251404
Aug. 12, 1996 [JP] Japan ............ 8-212738

[51] Int. Cl.⁶ .................................... H01M 4/02
[52] U.S. Cl. ........................... 429/212; 429/213
[58] Field of Search .................... 429/212, 213

[56] References Cited

U.S. PATENT DOCUMENTS

| | | | |
|---|---|---|---|
| 3,708,244 | 1/1973 | Bernstein | 429/213 |
| 4,833,048 | 5/1989 | Dejonghe et al. | |
| 5,413,882 | 5/1995 | Uemachi et al. | 429/213 |
| 5,460,905 | 10/1995 | Skotheim | 429/213 |
| 5,571,292 | 11/1996 | Sotomura et al. | 29/623.5 |

FOREIGN PATENT DOCUMENTS 5-74459  3/1993  Japan.

OTHER PUBLICATIONS

CA accession number 78:91010. Haist et al. "photographic emulsions containing heterocyclic disulfides" Jan. 21, 1972.
Liu, Meilin et al., "Electrochemical Properties of Organic Disulfide/Thiolate Redox Couples", J. Electrochem. Soc., 136(9):2570–2575 (1989) month not available.

Primary Examiner—M. Nuzzolillo
Attorney, Agent, or Firm—Finnegan, Henderson, Farabow, Garrett & Dunner, L.L.P.

[57] ABSTRACT

An electrode material includes a sulfide compound containing an oxadiazole ring as an active substance. The secondary battery using such a material provides a large current at room temperature.

24 Claims, 7 Drawing Sheets

ELECTRODE MATERIAL AND SECONDARY BATTERY

BACKGROUND OF THE INVENTION

1. Field of the Invention

The present invention relates to an electrode material for a secondary battery and more particularly to a sulfide series electrode material.

2. Description of the Prior Art

In recent years, demands for portability of communication appliances and OA (Office Automation) appliances have intensified competition for light weight materials and miniaturization. Correspondingly, a secondary battery which is used as in such an appliance or as a power source for an electric vehicle requires high efficiency. Under these circumstances, various kinds of batteries using new electrode materials have been developed. Among them, an electrode material using a sulfide compound (hereinafter referred to as a "disulfide electrode material") has been noticeable because of its relatively high energy density as disclosed in U.S. Pat. No. 4,833,048, the disclosure of which is incorporated herein by reference. For example, a sulfide compound having a triazine ring or a thiadiazole ring has been used as an electrode material.

Assuming that the disulfide compound is represented by R—S—S—R (R denotes an organic functional group), the disulfide bond (S—S coupling) is cleaved by supplying two electrons by electrolytic reduction. It is combined with a cation or proton ($M^+$) in an electrolytic solution to provide a salt represented by $2(R-S^-.M^+)$. The salt is returned to original R—S—S—R by electrolytic oxidation to discharge two electrons. The secondary battery is expected to have an energy density of 50 Wh/kg or more which is approximately equal to that of other ordinary secondary batteries.

However, as reported by the inventors of the above U.S. patent in J. Electrochem. Soc, Vol. 136, No. 9, pages 2570–2575 (1989), the electron moving speed in an electrode reaction of the sulfide-series secondary battery is very low so that it is difficult to take out a large current during practical use at room temperatures. The above sulfide-series secondary battery is limited to use at 60° C. or higher.

As a technique for improving the sulfide-series secondary battery so as to deal with a large current, as disclosed in JP-A-5-74459, an electrode material has been propsed in which an organic compound having a thiadiazole ring and a disulfide group is combined with a conductive polymer such as polyaniline.

However, such an improvement did not permit a sufficiently large current at room temperature.

SUMMARY OF THE INVENTION

An object of the present invention is to provide a sulfide-series electrode material which can take out a large current at room temperature.

Another object of the present invention is to provide a secondary battery which can take out a large current at room temperature.

In order to attain the above objects, there is provided a sulfide-series electrode material having oxadiazole ring.

The secondary battery using the electrode material according to the present invention can take out a larger current at room temperature than a conventional battery using a thiadiazole ring.

DESCRIPTION OF THE PREFERRED EMBODIMENTS

Figure 1:
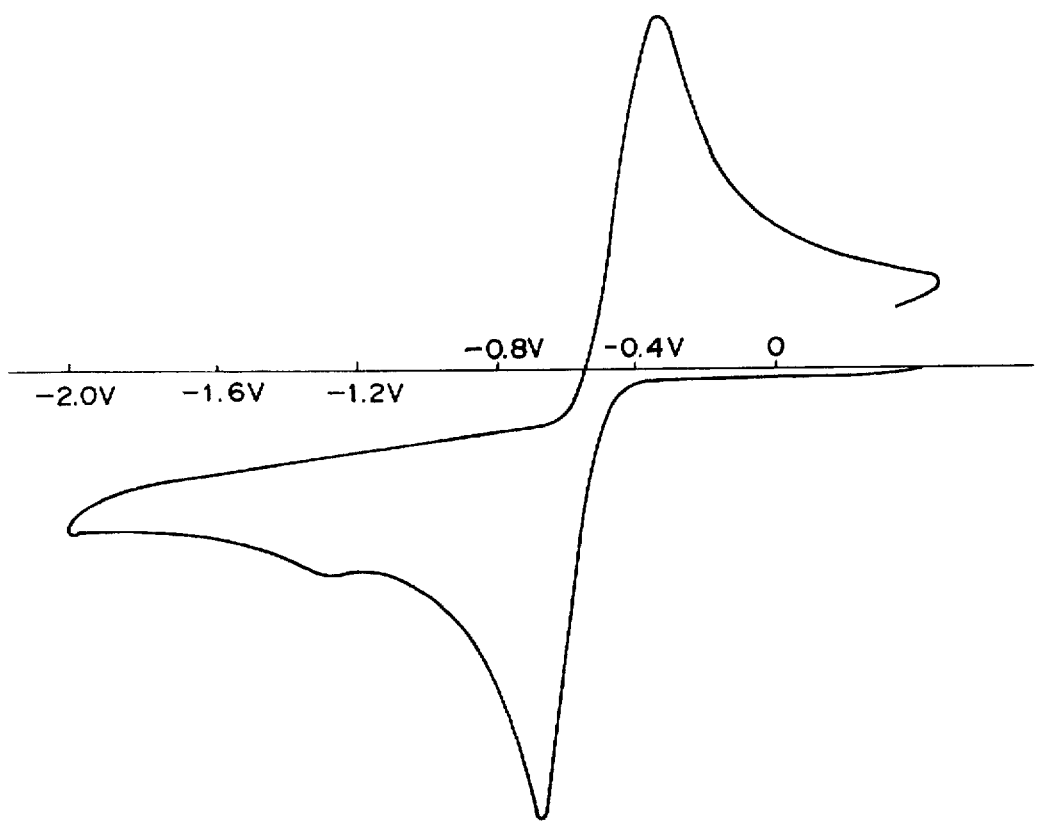
FIG. 1 is a cyclic voltamogram of Battery No. 1 according to an embodiment (Embodiment 1) of the present invention.

In the present invention, a sulfide-series electrode material having an oxadiazole ring means a compound in which a sulfur atom is directly combined with the oxadiazole ring and a material containing such a compound.

Such a sulfide-series electrode material having an oxadiazole ring, which contains an oxygen of an aromatic hetero ring, promotes reactions of creation/dissociation of a disulfide bond.

Some of the sulfide-series electrode materials having such an oxadiazole preferably have a group represented by chemical formula (1) or anion represented by chemical formula (2) because of extreme promotion of the creation/dissociation of the disulfide bond influenced by a phenyl group. Particularly, a dimer such as 2, 2'-dithiobis (5-phenyl, 3, 4-oxadiazole), represented by chemical formula (3) is preferable since it gives very small reduction in the capacity even if the number of cycles is increased. A polysulfide compound such as trisulfide having n ranging from 1 to 5 in chemical formula (3) is preferable as it can have higher energy density.

Chemical Formula (1)

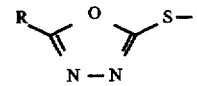

where R represents a hydrogen atom or an organic group.

Chemical Formula (2)

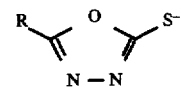

where R represents a hydrogen atom or an organic group.

Chemical Formula (3)

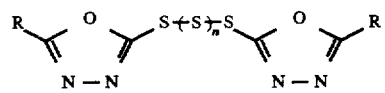

where R represents a hydrogen atom or an organic group, and n represents an integer of 0 to 5.

However, in the group represented by chemical formula (1) and the ion represented by chemical formula (2), although R may be an alkyl group such as a methyl group, an ethyl group, etc., an annular organic material such as an amino group, a carboxyl group, an alkyl amino group, or an amide group, an aromatic compound; or an oxygen-introducing compound, it is preferably a group capable of supplying electrons, such as a methyl group.

Since the above active material is not conductive, it is mixed with an electronic conductive material and an ionic conductive material to fabricate a positive electrode (hereinafter referred to as a "cathode"). The electronic conductive material may be metallic powder of carbon, titanium, nickel, etc. The ionic conductive material may be a liquid electrolyte in which electrolytic acid (such as perchorolate) is mixed with a solvent (such as propylene carbonate), or a solid electrolyte (such as polyethylene oxide) in which electrolyte acid is solved.

Both a liquid electrolyte and a solid polymer electrolyte can be used as an electrolyte of the battery. On the other hand, the material of a negative elecrode (hereinafter referred to as an "anode") may be an alkaline metal or a material with the alkaline metal removed or inserted.

EMBODIMENT 1

Evaluation by Cyclic Voltammetry Using 2, 2'-Dithiobis (5-Phenyl-1, 3, 4-Oxadiazole)

1. Synthesis of 2, 2'-dithiobis (5-phenyl-1, 3, 4-oxadiazole)

5 mmol of iodine is dissolved in 30 ml methanol in an argon atmosphere. Into the solution thus formed, a methanol solution in which 10 mmol 2-mercapto-5-phenyl-1, 3, 4-oxadiazole and 5 mmol sodium methoxide is dropped slowly.

Thereafter, the solution thus formed is stirred for three hours, and cooled to $-60°$ C. Then, the precipitate thus created is separated by filtration. The precipitate is decompressed and dried, and recrystallized three times by ethanol to provide 2, 2'-dithiobis (5-phenyl-1, 3, 4-oxadiazole).

2. Synthesis of 2, 2'-Dithiobis (5-Methyl 1, 3, 4-Thiadiazole (Comparative Example 1)

Likewise, 2, 2'-dithiobis (5-methyl 1, 3, 4-thiadiazole) is synthesized using 2-mercapto-5-methyl-1, 3, 4-thiadiazole in place of 2-mercapto-5-phenyl-1,3, 4-oxadiazole.

Incidentally, in the filtration step in both cases, an object material as well as filtered medium is contained in the filtrate. Therefore, the object material is recovered and refined in a separate step. The details thereof are not described here.

The product thus created has been recognized to be the object material by a FAB mass analyzer and an infrared spectroscopic analyzer.

Using 2, 2'-dithiobis (5-phenyl-1, 3, 4-oxadiazole) and 2, 2'-dithiobis (5-methyl-1, 3, 4-thiadiazole), a battery was made. It should be noted that the above steps are performed in an argon atmosphere contained in a globe box.

As an electrolyte, two electrolytic solutions were prepared in which lithium trifluoromethanesulfonate ($LiCF_3SO_3$) is solved in 30 ml γ-butyrolactone of to provide a concentration of 0.2 mmol/l. The two synthesized disulfide compounds of 2, 2'-dithiobis (5-phenyl-1, 3, 4-oxadiazole and 2, 2'-dithiobis (5-methyl-1, 3, 4-thiadiazole) were solved in the prepared solutions, respectively to provide a concentration of 5 mmol/l.

Using these two solutions, with a sample electrode of glassy carbon, a counter electrode of a platinum wire and a reference electrode of silver/silver-ion ($Ag/Ag^+(LiClO_4)$ electrode), the battery was made. In this case, the battery having 2, 2'-dithiobis (5-phenyl-1, 3, 4-oxadiazole) was taken as Battery 1 (Embodiment 1) and the battery having 2, 2'-methyl dithiobis (5-methyl-1, 3, 4-thiadiazole) was taken as Battery 2 (Comparative Example 1). The cyclic voltamograms of Batteries 1 and 2 were measured at 23° C.

Figure 2:
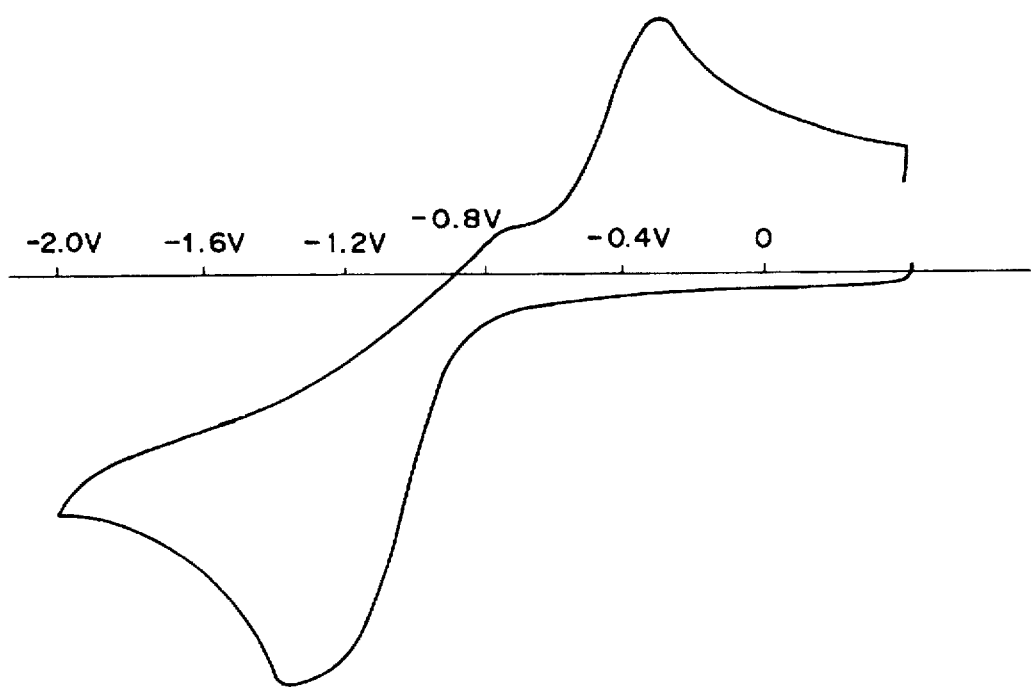
FIG. 2 is a cyclic voltamogram of Battery No. 2 according to a comparative example (Comparative Example 1)

The measurement result of Battery 1 is shown in FIG. 1, whereas that of Battery 2 is shown in FIG. 2 (In these figures, the ordinate represents a current value in the same scale). As seen from FIGS. 1 and 2, the peak separation between the anode peak potential and the cathode peak peak potential is larger in Battery 2 than in Battery 1. This reveals that the Battery 1 having 2, 2'-dithiobis (5-phenyl-1, 3, 4-oxadiazole) can take out a larger current.

EMBODIMENTS 2–7

The test results of coin-type secondary batteries are as follows. In these tests, in the steps where mixing of nitrogen, oxygen and water should be obviated, work was carried out within an argon gas flow as necessity requires. Dehydrated and distilled solvents were used where necessity requires.

A Synthesis of active materials:

[EMBODIMENT 2]

Synthesis of 2, 2'-Dithiobis (5-Methyl-1, 3, 4-Oxadiazole)

Within a nas flask having a capacity of 300 ml, 5 mmol iodine is dissolved in 30 ml methanol in an argon atmosphere. Into the solution thus 10 mmol, 2-mercapto-5-methyl-1, 3, 4-oxadiazole of and 5 mmol sodium methoxide dissolved in 30 ml methanol is dropped slowly. Thereafter, the solution thus formed is stirred for thirty minutes, and cooled to $-40°$ C. Then, the precipitate thus created is separated by vacuum/filteration, thus providing 2, 2'-dithiobis (5-methyl-1, 3, 4-oxadiazole) represented by Chemical Formula (4) (hereinafter referred to as "active material α").

Chemical Formula (4):

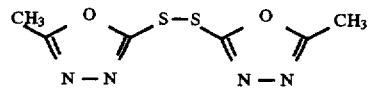

[EMBODIMENT 3]

Synthesis of 2, 2'-Trithiobis (5-Methyl-1, 3, 4-Oxadiazole)

Within a nas flask having a capacity of 1000 ml, 1000 mmol 2-mercapto-5-methyl-1, 3, 4-oxadiazole is dissolved in 800 ml formamide. In the solution thus formed, a 100 ml solution of $N_1N$-dimethylformamide in which sulfur dichloride of 1.25 mmol/l has been solved of is dropped slowly. Upon completion of the dropping, the solution was stirred for one hour, thus providing a precipitate. The solution was cooled to $-40°$ C., thus increasing the amount of precipitate. The precipitate was washed by diethyl diethylether and subsequently decompressed and dried, thus providing 2, 2'-trithiobis (5-methyl-1, 3, 4-oxadiazole) represented by chemical formula (5) (hereinafter referred to as "active material β").

Chemical Formula (5)

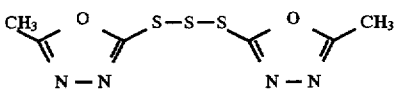

[EMBODIMENT 4]

Synthesis of 2, 2'-Tetrathiobis (5-Methyl-1, 3, 4-Oxadiazole)

Like the synthesis of 2, 2'-trithiobis (5-methyl-1, 3, 4-oxadiazole), except that a solution of 125 mmol disulfur-dichloride of dissolved in 100 ml $N_1N$-dimethyl formamide solution is used in place of the solution of sulfur dichloride/$N_1N$-dimethyl formamide solution. 2, 2'-tetrathiobis (5-methyl-1, 3, 4-oxadiazole) which is represented by chemical formula (6) (hereinafter referred to as "active material γ"), is provided.

Chemical Formula (6)

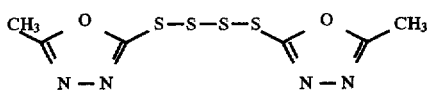

[EMBODIMENT 5]

Synthesis of 2, 2'-Dithiobis (5-Phenyl-1, 3, 4-Oxadiazole)

Within a flask having a capacity of 300 ml, 5 mmol iodine is dissolved in 30 ml methanol in an argon atmosphere. Into the solution thus formed, 10 mmol 2-mercapto-5-phenyl-1, 3, 4-oxadiazole of 10 mmol, and 5 mmol sodium methoxide dissolved in 30 ml methanol is dropped slowly. Thereafter, the solution thus formed is stirred for thirty minutes, and cooled to –40° C. Then, precipitate thus created is separated by vacuum filteration, thus providing 2, 2'-dithiobis (5-phenyl-1, 3, 4-oxadiazole) represented by Chemical Formula (7) (hereinafter referred to as "active material δ").

Chemical Formula (7)

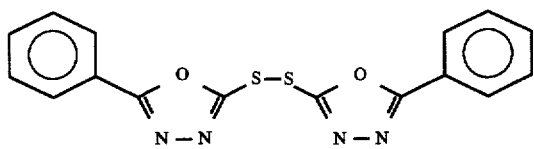

[EMBODIMENT 6]

Synthesis of 2, 2'-Trithiobis (5-Phenyl-1, 3, 4-Oxadiazole)

Like the synthesis of 2, 2'-trithiobis (5-methyl-1, 3, 4-oxadiazole), except that 2-mercapto-5-phenyl-1, 3, 4-oxadiazole was used in place of 2-mercapto-5-methyl-1, 3, 4-oxadiazole, 2, 2'-trithiobis (5-phenyl-1, 3, 4-oxadiazole), which is represented by chemical formula (8) (hereinafter referred to as "active material ζ") was obtained.

Chemical Formula (8)

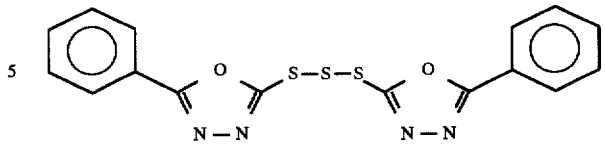

[EMBODIMENT 7]

Synthesis of 2, 2'-tetrathiobis (5-Phenyl-1, 3, 4-Oxadiazole)

Like the synthesis of 5, 5'-tetrathiobis (5-methyl-1, 3, 4-oxadiazole, except that 2-mercapto-5-phenyl-1, 3, 4-oxadiazole was used in place of 2-mercapto-5-methyl, 1, 3, 4-oxadiazole. 2, 2'-tetrathiobis (5-phenyl-1, 3, 4-oxadiazole), which is represented by chemical formula (9) (hereinafter referred to as "active material ζ"), was obtained.

Chemical Formula (9)

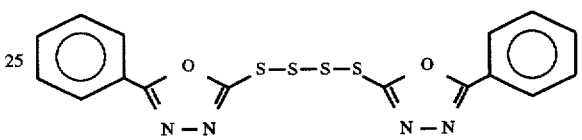

[COMPARATIVE EXAMPLE 2]

Synthesis of 2, 2'-Dithiobis (5-Methyl-1, 3, 4-Thiadiazole

Within a flask having a capacity of 1000 ml, 150 mmol of 2-mercapto-5-methyl-1, 3, 4-thiadiazole is dissolved in 450 ml methanol. Into the solution thus prepared, 39 ml of 34.5% hydrogen peroxide is dropped slowly. The solution was stirred for one hour at room temperature. Thereafter, by decompression and heating, precipitate was created. The solution was filtered and washed. By subsequent decompression and drying, crude crystal was obtained. By recrystallization using ethanol, 2, 2'-dithiobis (5-methyl-1, 3, 4-thiadiazole) (hereinafter referred to as "active material ε") was obtained.

[COMPARATIVE EXAMPLE 3]

Synthesis of 2, 2'-Trithiobis (5-Methyl-1, 3, 4-Thiadiazole

Within a flask having a capacity of 1000 ml, 100 mmol 2-mercapto-5-methyl-1, 3, 4-thiadiazole is dissolved in 200 ml tetrahydrofuran. Into the solution thus prepared, 125 mmol sulfur dichloride is dropped slowly, thus giving precipitate. After the dropping, the solution was stirred at room temperature for 5–10 minutes. The precipitate was filtered and washed by tetrahydrofuran. The precipitate was decompressed and dried, thus providing 2, 2'-trithiobis (5-methyl-1, 3, 4-thiadiazole) (hereinafter referred to as "active material θ").

[COMPARATIVE EXAMPLE 4]

Synthesis of 2, 2'-Tetrathiobis (5-Methyl-1, 3, 4-Thiadiazole)

Like the synthesis of 2, 2'-trithiobis (5-methyl-1, 3, 4-thiadiazole), except that 125 mmol disulfur dichloride was used in place of sulfur dichloride. 2, 2'-tetrathiobis (5-methyl-1, 3, 4-thiadiazole (hereinafter referred to as "active material ι") was obtained.

B. Analysis of the Active Materials

Various kinds of analysis were performed for the active materials α–ζ. They include CHNS/O analysis (Perkinelemer Co. Inc. PE 2400 series II, CHNS/O analyzer), $^1$H-NMR spectrum analysis and $^{13}$C-NMR spectrum analysis.

Figure 3:
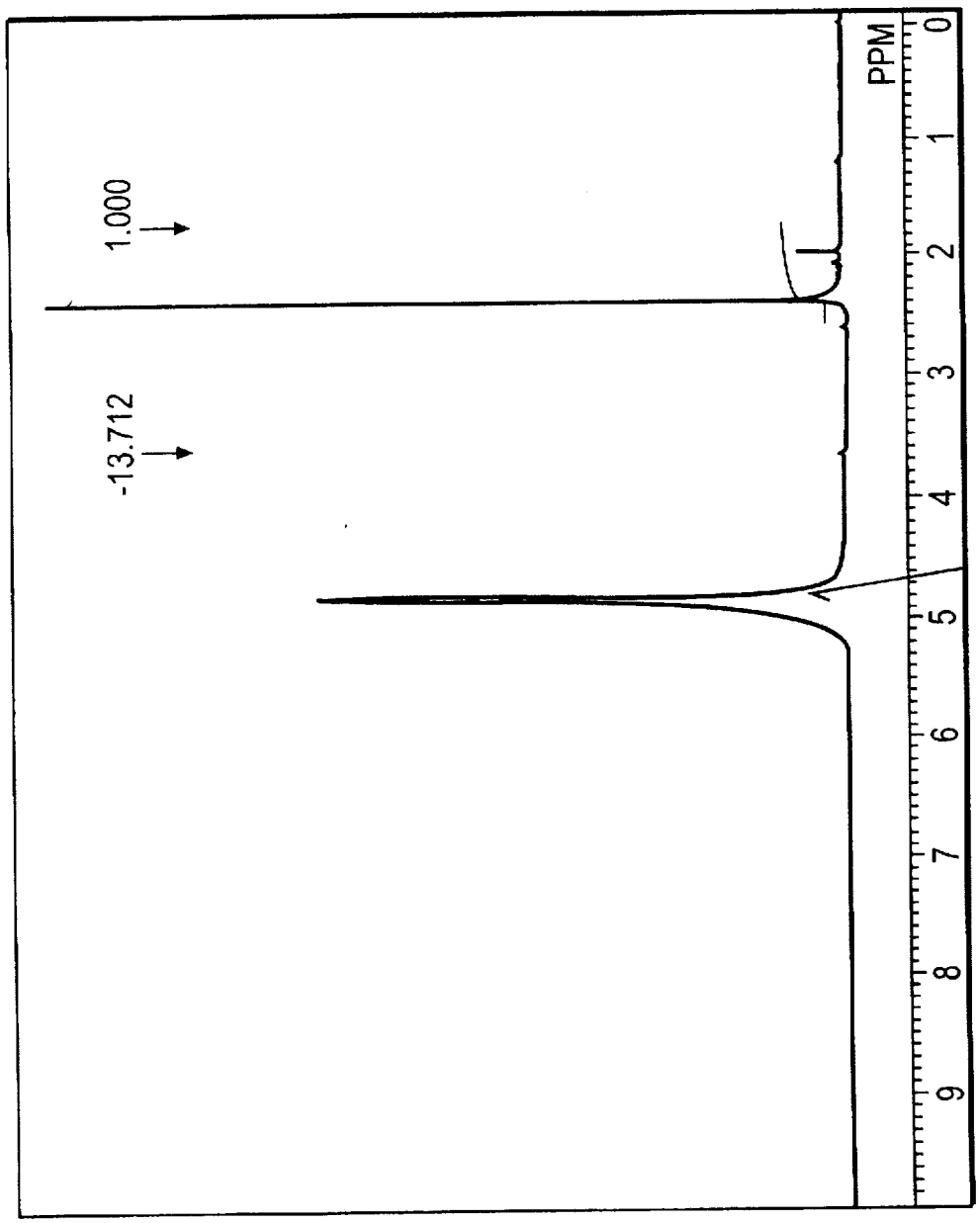
FIG. 3 is a graph showing the $^1$H-NMR spectrum of an active material α.
Figure 4:
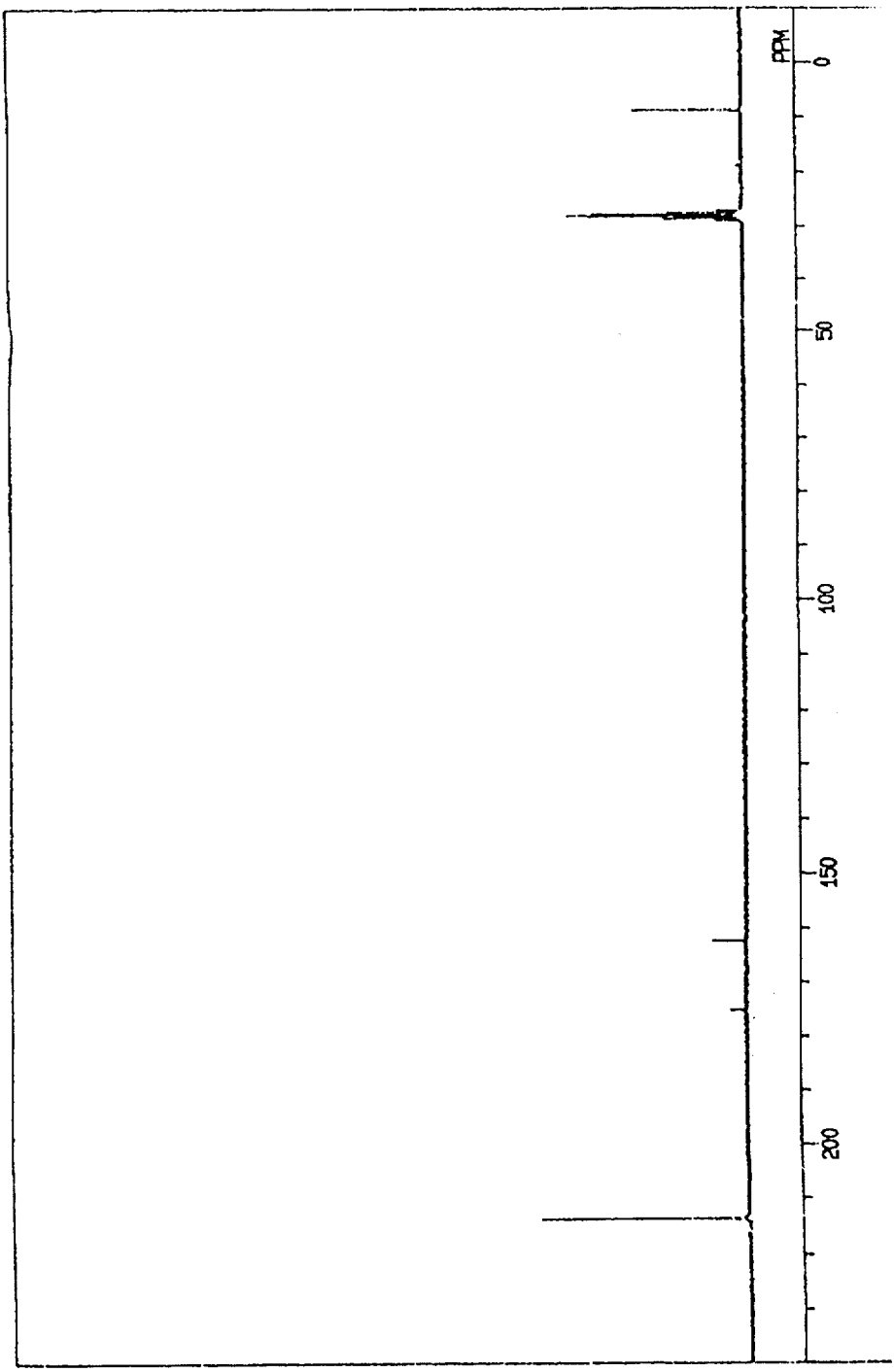
FIG. 4 is a graph showing the $^{13}$C-NMR spectrum of the active material α.
Figure 5:
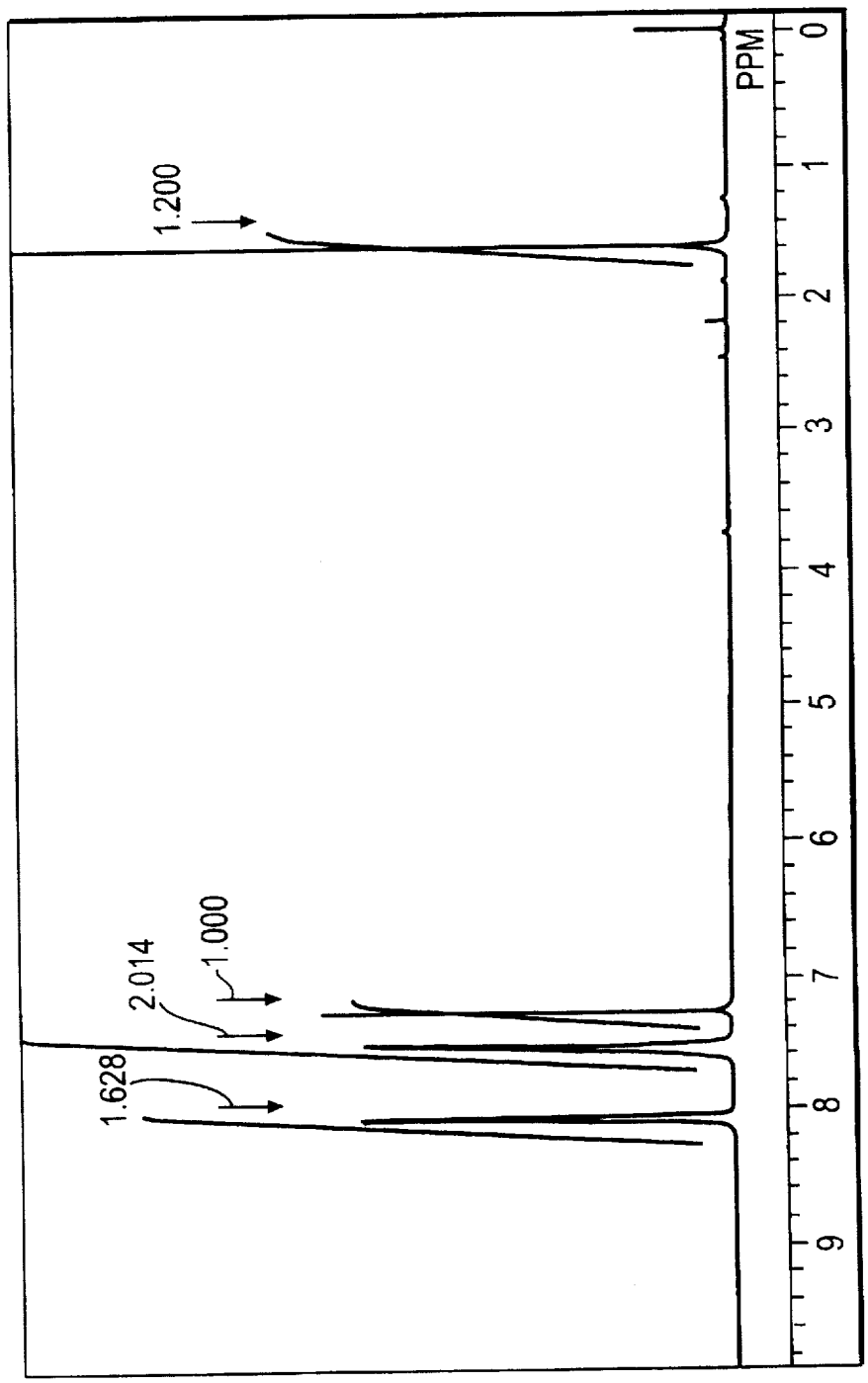
FIG. 5 is a graph showing the $^1$H-NMR spectrum of an active material δ.
Figure 6:
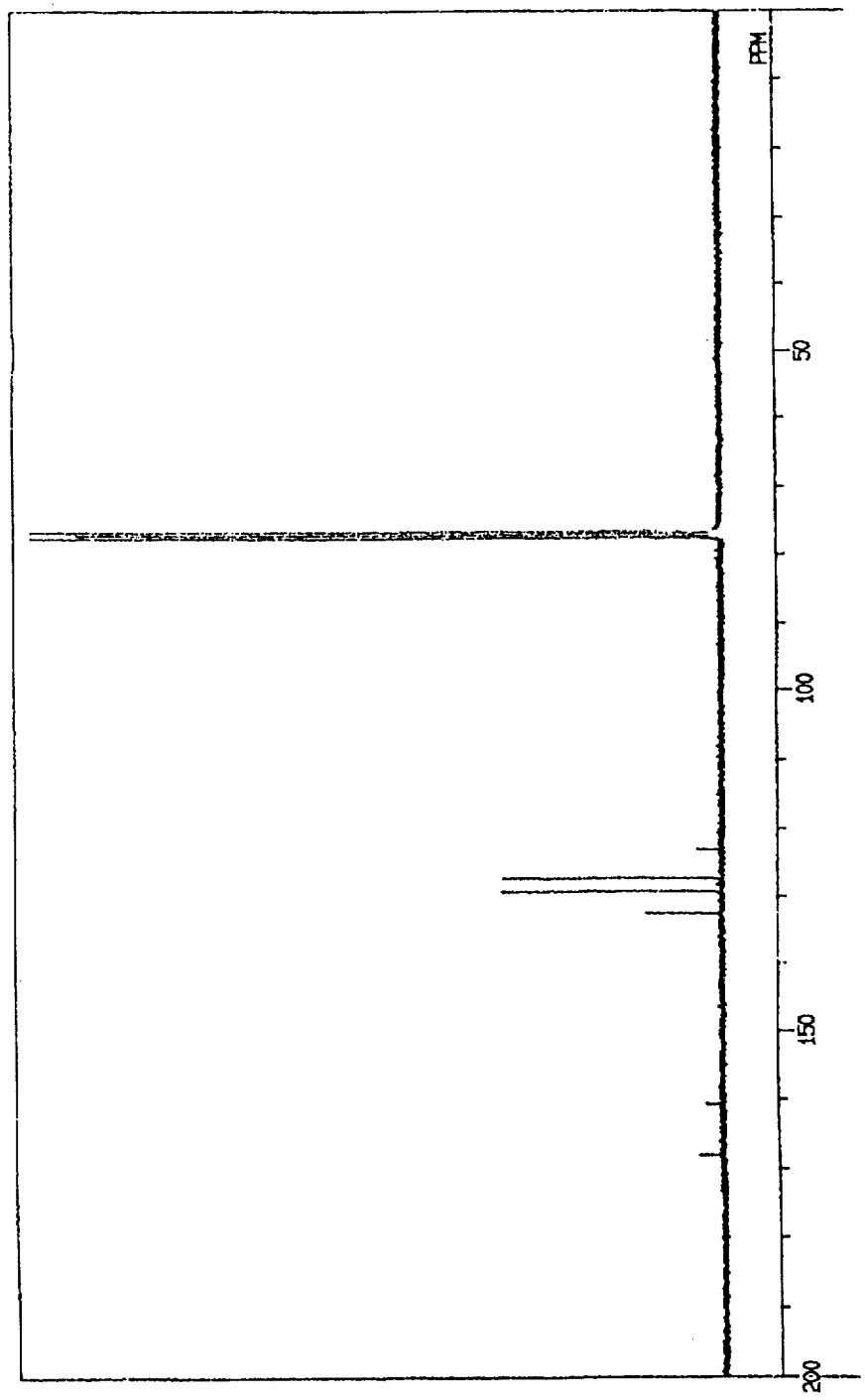
FIG. 6 is a graph showing the $^{13}$C-NMR spectrum of the active material δ.

Table 1 shows the CHNS analysis and O analysis (mass ratio of carbon, hydrogen, nitrogen, sulfur and oxygen converted into integer ratio using nitrogen as a standard), and the molecular weights recognized by the FAB-MS analysis. Table 2 shows the result of the $^1$H-NMR and $^{13}$C-NMR spectrum analysis. FIGS. 3 and 4 show $^1$H-NMR and $^{13}$C-NMR spectra, respectively of the active α. FIGS. 5 and 6 show $^1$H-NMR and $^{13}$C-NMR spectra respectively of the active material δ.

TABLE 1

| Active Material | CHNS Analysis Result | | | | | FAB-MS Analysis Result |
|---|---|---|---|---|---|---|
| | C | H | N | S | O | Molecular Weight |
| α | 6.0 | 6.1 | 4.0 | 2.0 | 2.0 | 230 |
| β | 6.0 | 5.9 | 4.0 | 3.0 | 2.0 | 262 |
| γ | 6.0 | 6.0 | 4.0 | 4.0 | 2.0 | 294 |
| δ | 16.0 | 9.9 | 4.0 | 2.0 | 2.0 | 354 |
| θ | 16.0 | 9.9 | 4.0 | 3.0 | 2.0 | 386 |
| ζ | 16.0 | 10.1 | 4.0 | 4.0 | 2.0 | 418 |

TABLE 2 unit: PPM

| | $^1$H-NMR | | | $^{13}$C-NMR | | | |
|---|---|---|---|---|---|---|---|
| Active Material | Deuterium Solvent | $CH_3$ Peak | $C_6H_5$ Peak | Deuterium Solvent | $CH_3$ Peak | C=N Peak | $C_6H_5$ Peak |
| α | Chloroform | 2.38 | — | Chloroform | 8.9 | 162.4, 175.2 | — |
| β | Chloroform | 2.40 | — | Chloroform | 9.1 | 162.8, 175.7 | — |
| γ | Chloroform | 2.43 | — | Chloroform | 9.2 | 162.8, 175.7 | — |
| δ | Acetone | — | 7.49–7.59 8.06–8.10 | Chloroform | — | 160.5, 167.9 | 123.0, 127.2, 129.2, 132.5 |
| ε | Acetone | — | 7.49–7.60 8.07–8.11 | Chloroform | — | 160.7, 167.9 | 123.0, 127.3, 129.3, 132.6 |
| ζ | Acetone | — | 7.51–7.61 8.06–8.12 | Chloroform | — | 160.7, 168.0 | 123.0, 127.2, 129.3, 132.6 |

C Making the Cathode

Mixed are the above active materials α–ι of 33 weight parts, lithium trifluoromethane sulfate (LiCF$_3$SO$_3$) of 18 weight parts, polyethylene oxide (molecular weight: two million) of 42 weight parts, carbon black (Kechen Black available from Lion Co. Ltd.) of 7 weight parts. For easy mixture, a small amount of acetonitrile is also added. The mixture is stirred so as to be uniform. The slurry thus obtained is developed using a Teflon petri dish and dried day and night at 80° C. to provide a film (having an average thickness of 600 μm). The film is punched out to provide a cathode having a diameter of 15 mm.

D Fabrication of the Solid Polymer Electrolyte

Acrylonitrile-methyl. acrylate copolymer of 1.5 g and γ-butyrolactone solution of 6.0 ml of lithium trifluoromethane sulfonate (LiCF$_3$SO$_3$) having a concentration of 1 mol/l are mixed and developed on the petri dish. The developer is heated to 120° C. and gradually cooled. The developer is punched out to provide a film having a diameter of 16 mm. This serves as a separator in assembling a battery.

E Making the Anode

The anode is made by punching out a lithium metal foil (having a thickness of 1.2 mm) to have a diameter of 15 mm.

Figure 7:
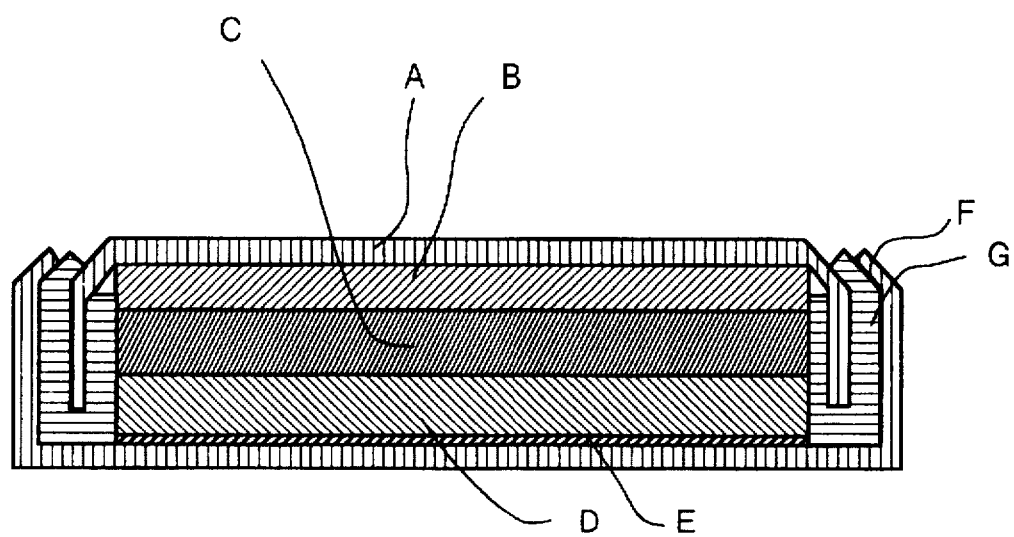
FIG. 7 is a sectional view showing a coin-type secondary battery fabricated in the embodiments.

F Assembling the Coin-type Cell 18 coin-shaped cells (2 for each of nine kinds of coin-shaped cells corresponding to Embodiments 2 to 7 and Comparative Examples 2 to 4) were fabricated using the cathodes containing the above nine kinds of active materials, solid polymer electrolytes and anodes. The section thereof is shown in FIG. 7. In FIG. 7, reference symbol A denotes an anode cap; B an anode; C a solid polymer electrolyte (serving as a separator); D a cathode; E a current collector made of stainless; F a cathode can; G a gasket for separating the inside of the battery from the outside and preventing the anode can from contacting the cathode can.

G Evaluation of Coin-type Cells

The coin-shaped cells having the above active materials was evaluated as follows.

For one of the two cells having the same active material, a current of 0.2 mA/cm$^2$ was supplied to the cathode, whereas for the other thereof, a current of 0.4 mA/cm$^2$ was supplied to the cathode.

Charging/discharging was carried out within a thermostat bath at 20° C. The charging was performed until the cell voltage becomes 4.5 V at the above current density whereas the discharging was performed until the cell voltage becomes 2.0 V. Before evaluation, charging/discharging is repeated twice and charging is carried out. The evaluation was performed at the subsequent discharging. The result at the current density of 0.2 mA/cm$^2$ is shown in Table 3, and that of the current density of 0.4 mA/cm$^2$ is shown in Table 4. In these tables, the capacitance density means capacitance of a cathode by weight, and the energy density means the value of the average voltage in discharging multiplied by the capacitance density. The using rate means the rate of the actual amount of electricity to that when assuming that the entire active material within the cathode contributes to discharging.

Figure 8:
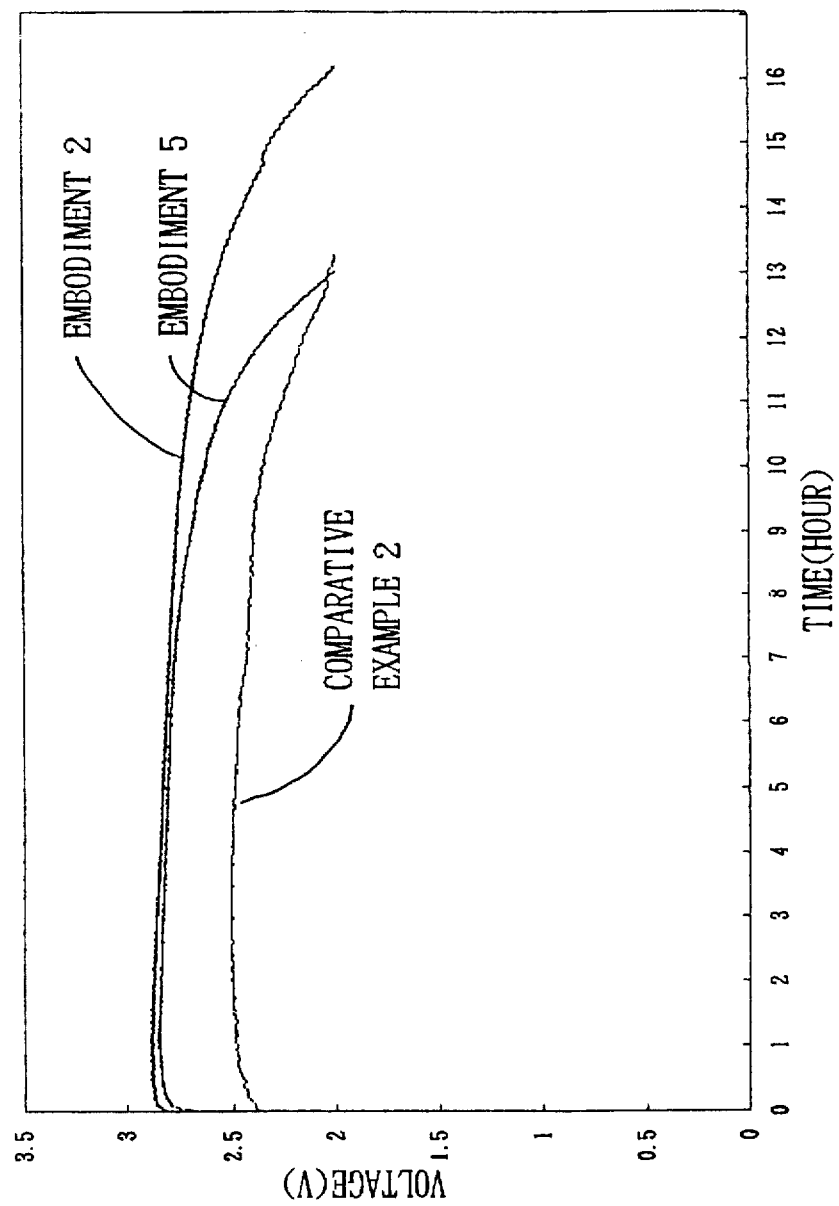
FIG. 8 is a graph showing the discharging curve (current density: 0.2 mA/cm$^2$) in cells using active materials α, δ and η.

FIG. 8 shows a discharging curve (current density: 0.2 mA/cm$^2$ of the cells using the active materials α, δ and η for evaluation which correspond to Embodiment 2, Embodiment 5 and Comparative Example 2).

TABLE 3

| | Active Material | Specific Capacity (Ah/kg) | Average Discharge Cell-Voltage (V) | Energy Density (Wh/kg) | Utilization (%) |
|---|---|---|---|---|---|
| Embodiment 2 | α | 60.2 | 2.72 | 163.7 | 78.4 |
| Embodiment 3 | β | 96.3 | 2.66 | 256.2 | 71.4 |
| Embodiment 4 | γ | 115.6 | 2.64 | 305.2 | 64.1 |
| Embodiment 5 | δ | 46.3 | 2.63 | 121.7 | 92.7 |
| Embodiment 6 | θ | 78.6 | 2.70 | 212.2 | 85.8 |
| Embodiment 7 | ζ | 98.9 | 2.67 | 264.1 | 78.0 |
| Comparative Example 2 | η | 49.6 | 2.41 | 119.6 | 73.6 |
| Comparative | Θ | 75.2 | 2.39 | 182.1 | 63.4 |

TABLE 3-continued

| | Active Material | Specific Capacity (Ah/kg) | Average Discharge Cell-Voltage (V) | Energy Density (Wh/kg) | Utilization (%) |
|---|---|---|---|---|---|
| Example 3 Comparative Example 4 | ι | 83.1 | 2.33 | 193.6 | 51.1 |

TABLE 4

| | Active Material | Specific Capacity (Ah/kg) | Average Discharge Cell-Voltage (V) | Energy Density (Wh/kg) | Utilization (%) |
|---|---|---|---|---|---|
| Embodiment 2 | α | 59.8 | 2.68 | 160.3 | 77.8 |
| Embodiment 3 | β | 95.5 | 2.65 | 253.1 | 70.8 |
| Embodiment 4 | γ | 113.4 | 2.62 | 297.1 | 62.9 |
| Embodiment 5 | δ | 46.4 | 2.66 | 122.9 | 93.0 |
| Embodiment 6 | θ | 77.5 | 2.63 | 203.8 | 84.6 |
| Embodiment 7 | ζ | 98.1 | 2.59 | 254.1 | 77.3 |
| Comparative Example 2 | η | 44.1 | 2.39 | 105.3 | 65.4 |
| Comparative Example 3 | Θ | 69.9 | 2.34 | 163.8 | 58.2 |
| Comparative Example 4 | ι | 76.3 | 2.32 | 176.9 | 46.9 |

As seen from the comparison of the secondary batteries (coin-type cells) according to the second to fourth embodiment with those according the second comparative example in Tables 3 and 4, the secondary batteries using the electrode materials adopted in the present invention have an average discharging voltage higher by about 300 mV than those of the secondary batteries using a thiadiazole ring. Thus, it was confirmed that the phenomenon in the cyclic voltammetry of the first embodiment and the first comparative example also applies to coin-type cells (secondary batteries). It can be seen that the secondary batteries using the electrode materials according to the present invention, which have higher average voltages and slightly higher capacity densities than those of the secondary batteries using the ordinary electrode materials having the thiadiazole ring, can provide a higher energy density than those of the latter. It can be seen that the secondary batteries using the active materials δ, θ and ζ having the phenyl group according to the fifth to seventh embodiments have a-higher using rate than those of the secondary batteries according to the second to fourth embodiments using the active materials α, β and γ. This is probably attributable to the fact that any interaction between π electrons of a phenyl group and those of carbon which serves as an electric collector improves the conductivity of the electrode and so improves the using rate.

Further, even if the discharging condition is increased from 0.2 mA/cm$^2$ to 0.4 mA/cm$^2$, the secondary battery using the electrode material according to the present invention provides a small reduction in the cathode utility. Thus, it was confirmed that the secondary battery using the electrode material according to the present invention can deal with the discharging by a large current.

What is claimed is:

1. An electrode comprising: an electrode material including a sulfide compound having an oxadiazole ring as an active substance.

2. An electrode according to claim 1, wherein said sulfide compound contains at least one member selected from a group according to Chemical Formula (1):

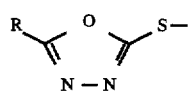

where R represents a hydrogen atom or an organic group; and an ion according to Chemical Formula (2):

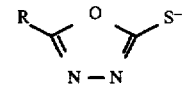

where R represents a hydrogen atom or an organic group.

3. An electrode material comprising a sulfide compound having a methyl oxadiazole ring as an active substance.

4. An electrode material comprising a sulfide compound having an oxadiazole ring as an active substance, wherein said sulfide compound is one selected from the group consisting of 2, 2'-dithiobis (5-methyl-1, 3, 4-oxadiazole), 2, 2'-trithiobis (5-methyl-1, 3, 4-oxadiazole), and 2, 2'-tetrathiobis (5-methyl-1, 3, 4-oxadiazole).

5. An electrode material according to claim 3, wherein said sulfide compound is one selected from the group consisting of 2, 2'-dithiobis (5-methyl-1, 3, 4-oxadiazole), 2, 2'-trithiobis (5-methyl-1, 3, 4-oxadiazole, and 2, 2'-tetrathiobis (5-methyl-1, 3, 4-oxadiazole).

6. An electrode material comprising a sulfide compound having a phenyl oxadiazole ring as an active substance.

7. An electrode material comprising a sulfide compound having an oxadiazole ring as an active substance, wherein said sulfide compound is one selected from the group consisting of 2, 2'-dithiobis (5-phenyl-1, 3, 4-oxadiazole), 2, 2'-trithiobis (5-phenyl-1, 3, 4-oxadiazole), and 2, 2'-tetrathiobis (5-phenyl-1, 3, 4-oxadiazole).

8. An electrode material according to claim 6, wherein said sulfide compound is one selected from the group consisting of 2, 2'-dithiobis (5-phenyl-1, 3, 4-oxadiazole), 2, 2'-trithiobis (5-phenyl-1, 3, 4-oxadiazole) and 2, 2'-tetrathiobis (5-phenyl-1, 3, 4-oxadiazole).

9. A secondary battery comprising:
   a cathode made of a sulfide material having an oxadiazole ring as an active material; and
   an anode located proximate the cathode, wherein the anode and cathode are arranged so as to form a secondary battery.

10. A secondary battery according to claim 9, wherein said sulfide compound contains at least one member selected from a group according to Chemical Formula (1):

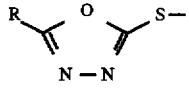

where R represents a hydrogen atom or an organic group; and an ion according to Chemical Formula (2):

where R represents a hydrogen atom or an organic group.

11. A secondary battery according to claim 9, wherein said tetrazol ring is a methyl oxadiazole ring.

12. A secondary battery according to claim 9, wherein said sulfide compound is one selected from the group consisting of 2, 2'-dithiobis (5-methyl-1, 3, 4-oxadiazole), 2, 2'-trithiobis (5-methyl-1, 3, 4-oxadiazole) and 2, 2'-tetrathiobis (5-methyl-1, 3, 4-oxadiazole).

13. A secondary battery according to claim 11, wherein said sulfide compound is one selected from the group consisting of 2, 2'-dithiobis (5-methyl-1, 3, 4-oxadiazole), 2, 2'-trithiobis (5-methyl-1, 3, 4-oxadiazole) and 2, 2'-tetrathiobis (5-methyl-1, 3, 4-oxadiazole).

14. A secondary battery according to claim 9, wherein said oxadiazole ring is a phenyl oxadiazole ring.

15. A secondary battery according to claim 9, wherein said sulfide compound is one selected from the group consisting of 2, 2'-dithiobis (5-phenyl-1, 3, 4-oxadiazole), 2, 2'-trithiobis (5-phenyl-1, 3, 4-oxadiazole).

16. A secondary battery according to claim 14, wherein said sulfide compound is one selected from the group consisting of the group consisting of 2, 2'-dithiobis (5-phenyl-1, 3, 4-oxadiazole), 2, 2'-trithiobis (5-phenyl-1, 3, 4-oxadiazole).

17. A secondary battery according to claim 9, wherein said secondary battery is a coin shaped.

18. A secondary battery according to claim 10, wherein said secondary battery is a coin shaped.

19. A secondary battery according to claim 11, wherein said secondary battery is a coin shaped.

20. A secondary battery according to claim 12, wherein said secondary battery is a coin shaped.

21. A secondary battery according to claim 13, wherein said secondary battery is a coin shaped.

22. A secondary battery according to claim 14, wherein said secondary battery is a coin shaped.

23. A secondary battery according to claim 15, wherein said secondary battery is a coin shaped.

24. A secondary battery according to claim 16, wherein said secondary battery is a coin shaped.

* * * * *

UNITED STATES PATENT AND TRADEMARK OFFICE
CERTIFICATE OF CORRECTION

PATENT NO. : 5,783,330
DATED : July 21, 1998
INVENTOR(S) : Katsuhiko NAOI et al.

It is certified that error appears in the above-identified patent and that said Letters Patent is hereby corrected as shown below:

Claim 11, column 10, line 65, "tetrazol" should read --oxadiazole--.
Claim 17, column 12, line 2, before "coin", delete "a".
Claim 18, column 12, line 4, before "coin", delete "a".
Claim 19, column 12, line 6, before "coin", delete "a".
Claim 20, column 12, line 8, before "coin", delete "a".
Claim 21, column 12, line 10, before "coin", delete "a".
Claim 22, column 12, line 12, before "coin", delete "a".
Claim 23, column 12, line 14, before "coin", delete "a".
Claim 24, column 12, line 16, before "coin", delete "a".

Signed and Sealed this

Thirtieth Day of March, 1999

Attest:

Q. TODD DICKINSON

*Attesting Officer*   *Acting Commissioner of Patents and Trademarks*